United States Patent
Cha et al.

(10) Patent No.: US 7,960,442 B2
(45) Date of Patent: Jun. 14, 2011

(54) NANOPOROUS MEDIA TEMPLATED FROM UNSYMMETRICAL AMPHIPHILIC POROGENS

(75) Inventors: Jennifer Nam Cha, Union City, CA (US); Geraud Jean-Michel Dubois, Los Gatos, CA (US); James Lupton Hedrick, Pleasanton, CA (US); Ho-Cheol Kim, San Jose, CA (US); Victor Yee-Way Lee, San Jose, CA (US); Teddie Peregrino Magbitang, San Jose, CA (US); Robert Dennis Miller, San Jose, CA (US); Willi Volksen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 11/111,343

(22) Filed: Apr. 20, 2005

(65) Prior Publication Data

US 2006/0241194 A1  Oct. 26, 2006

(51) Int. Cl.
*C08J 9/00* (2006.01)
(52) U.S. Cl. .......................................................... 521/77
(58) Field of Classification Search ...................... 521/77
See application file for complete search history.

(56) References Cited

U.S. PATENT DOCUMENTS

| | | | |
|---|---|---|---|
| 4,507,466 A | 3/1985 | Tomalia et al. | |
| 4,558,120 A | 12/1985 | Tomalia et al. | |
| 4,568,737 A | 2/1986 | Tomalia et al. | |
| 4,587,329 A | 5/1986 | Tomalia et al. | |
| 4,631,337 A | 12/1986 | Tomalia et al. | |
| 4,694,064 A | 9/1987 | Tomalia et al. | |
| 4,713,975 A | 12/1987 | Tomalia et al. | |
| 4,737,550 A | 4/1988 | Tomalia | |
| 4,857,599 A | 8/1989 | Tomalia et al. | |
| 4,871,779 A | 10/1989 | Killat et al. | |
| 5,136,096 A * | 8/1992 | Newkome et al. | 564/507 |
| 5,154,853 A * | 10/1992 | Newkome et al. | 516/56 |
| 5,196,502 A * | 3/1993 | Turner et al. | 528/272 |
| 5,338,532 A * | 8/1994 | Tomalia et al. | 424/1.49 |
| 5,418,301 A | 5/1995 | Hult et al. | |
| 5,527,524 A * | 6/1996 | Tomalia et al. | 424/1.33 |
| 5,895,263 A | 4/1999 | Carter et al. | |
| 6,093,636 A | 7/2000 | Carter et al. | |
| 6,097,095 A | 8/2000 | Chung | |
| 6,107,357 A | 8/2000 | Hawker et al. | |
| 6,277,766 B1 | 8/2001 | Ayers | |

(Continued)

OTHER PUBLICATIONS

Baney et al., (1995), "Silsesquioxanes," *Chemical Reviews*, 95(5):1409-1430.

(Continued)

*Primary Examiner* — Mark Eashoo
*Assistant Examiner* — Megan McCulley
(74) *Attorney, Agent, or Firm* — Isaac M. Rutenberg; Bozicevic, Field & Francis LLP

(57) ABSTRACT

Substantially or roughly spherical micellar structures useful in the formation of nanoporous materials by templating are disclosed. A roughly spherical micellar structure is formed by organization of one or more spatially unsymmetric organic amphiphilic molecules. Each of those molecules comprises a branched moiety and a second moiety. The branched moiety can form part of either the core or the surface of the spherical micellar structure, depending on the polarity of the environment. The roughly spherical micellar structures form in a thermosetting polymer matrix. They are employed in a templating process whereby the amphiphilic molecules are dispersed in the polymer matrix, the matrix is cured, and the porogens are then removed, leaving nanoscale pores.

21 Claims, 6 Drawing Sheets

U.S. PATENT DOCUMENTS

| | | | |
|---|---|---|---|
| 6,372,666 | B1 | 4/2002 | Ramos et al. |
| 6,399,666 | B1 | 6/2002 | Hawker et al. |
| 6,426,372 | B1 | 7/2002 | Minami et al. |
| 6,541,107 | B1 | 4/2003 | Zhong et al. |
| 6,602,804 | B2 | 8/2003 | Allen et al. |
| 6,630,520 | B1 | 10/2003 | Bruza et al. |
| 6,653,358 | B2 | 11/2003 | Bruza et al. |
| 6,670,285 | B2 | 12/2003 | Hawker et al. |
| 6,685,983 | B2 | 2/2004 | Hawker et al. |
| 6,747,123 | B2 | 6/2004 | Chen et al. |
| 2002/0055891 | A1 | 5/2002 | Yang |
| 2002/0120096 | A1* | 8/2002 | Tsuchida et al. ............... 528/332 |
| 2002/0123240 | A1 | 9/2002 | Gallagher et al. |
| 2002/0132496 | A1 | 9/2002 | Ball et al. |
| 2002/0164891 | A1 | 11/2002 | Gates et al. |
| 2003/0165625 | A1 | 9/2003 | So et al. |
| 2003/0175534 | A1 | 9/2003 | Chen et al. |
| 2003/0207595 | A1 | 11/2003 | Ralamasu et al. |
| 2003/0216058 | A1 | 11/2003 | Ko et al. |
| 2004/0023453 | A1 | 2/2004 | Xu et al. |
| 2004/0091624 | A1 | 5/2004 | Chen et al. |
| 2004/0137241 | A1 | 7/2004 | Lin et al. |
| 2004/0157248 | A1 | 8/2004 | Cox et al. |

OTHER PUBLICATIONS

Bates, (1991), "Polymer-polymer phase behavior," *Science*, 251:898-905.

Chang et al., (2004), "Poly(methyl silsesquioxane)/amphiphilic block copolymer hybrids and their porous derivatives: Poly(styrene-*block*-acrylic acid) and poly(styrene-*block*-3-trimethoxysilylpropyl methacrylate)," *Journal of Polymer Science. Part B: Polymer Physics*, 42(24):4466-4477.

Hawker et al., (Apr. 2000), "Supramolecular Approaches to Nanoscale Dielectric Foams for Advanced Microelectronic Devices," *MRS Bulletin*, 54-58.

Hedrick et al., (1998), "Templating Nanoporosity in Thin-Film Dielectric Insulators," *Advanced Materials*, 10(13):1049-1053.

Heise et al., (2000), "Starlike Polymeric Architectures by Atom Transfer Radical Polymerization: Templates for the Production of Low Dielectric Constant Thin Films," *Macromolecules*, 33:2346-2354.

Miller et al., (1999), "Porous Organosilicates for On-Chip Dielectric Applications," *MRS Symposium Proceedings*, 565:3-15.

Miller et al., (2004), "Nanoporous, Low-Dielectric Constant Organosilicate Materials Derived from Inorganic Polymer Blends," *ACS Symposium Series, Polymers for Microelectronics and Nanoelectronics*, Lin et al., eds., 11:144-160.

Nguyen et al., (1999), "Low-dielectric, Nanoporous Organosilicate Films via Inorganic/Organic Polymer Hybrid Templates," *Chem. Mater.*, 11:3080-3085.

Nguyen et al., (2000), "Hyperbranched Polyesters as Nanoporosity Templating Agents for Organosilicates," *Macromolecules*, 33:4281-4284.

Volksen et al., (2003), "Porous Organosilicates for On-Chip Applications: Dielectric Generational Extendibility by the Introduction of Porosity," *Low Dielectric Constant Materials for IC Applications*, Ho et al., eds., Springer-Verlag, 6:167-202.

Weener et al., (2001), "Some Unique Features of Dendrimers Based Upon Self-Assembly and Host-Guest Properties," *Dendrimers and Other Dendritic Polymers*, Frechet and Tomalia, eds., Wiley, 16:387-424.

Yang et al., (2002), "Nanoporous Ultralow Dielectric Constant Organosilicates Templated by Triblock Copolymers", *Chem. Mater.*, 14:369-374.

Yang et al., (2003), "Characterization of Nanoporous Ultra Low-κ Thin Films Templated by Copolymers with Different Architectures", *Radiation Physics & Chemistry*, 68:351-356.

\* cited by examiner

NANOPOROUS MEDIA TEMPLATED FROM UNSYMMETRICAL AMPHIPHILIC POROGENS

TECHNICAL FIELD

This invention relates generally to the fields of polymer chemistry and nanotechnology. More specifically, it relates to polymeric porogens which can serve as templates for the formation of porous materials.

BACKGROUND

There are a wide variety of applications for nanoporous materials. One application of interest is as dielectrics in the manufacture of integrated circuits. The introduction of porosity into a dielectric generally reduces its dielectric constant, since the dielectric constant of air is close to 1 while that of the common dielectric materials is higher. The reduction of dielectric constant is desirable for a variety of reasons in integrated circuit manufacturing. Another application of porosity is the formation of very small channels in the material which may be used for a variety of purposes. More generally, nanoporous materials have been considered for use in such applications as photonic devices, catalysis, environmental pollution control, separation and isolation of biological molecules, membranes, and energy storage.

The integrated circuit application is a particularly interesting one for nanoporous materials. Integrated circuits consist primarily of transistors and other devices interconnected by wires. The wires are separated from other wires and from the integrated circuit substrate by dielectric films which must be deposited onto the integrated circuit during its manufacturing process. The common dielectric material used in integrated circuits was for decades silicon dioxide, whose dielectric constant k lies between 3.9 and 4.2. Generally speaking the capacitance of wires to ground and to other wires in an integrated circuit will be proportional to the dielectric constant of the dielectric material which separates them. The time for a signal to propagate over a wire in an integrated circuit is related to the product RC, R being the resistance of the wire and C its capacitance to ground. Thus, a reduction of the dielectric constant, leading to a reduction in C, would speed signal propagation and so would tend to make integrated circuits faster. A reduction in dielectric constant would also reduce the power required for signal propagation, which is also approximately proportional to C. Because of this, it is desirable to manufacture integrated circuits which use a dielectric with a significantly lower dielectric constant than silicon dioxide.

A large number of approaches have been attempted to create nanoporous materials. One approach which is generally promising is the use of sacrificial porogens. A sacrificial porogen is a substance which mixes with a polymer matrix out of which the nanoporous material will be made. As the nanohybrid material forms from the matrix, for example through controlled thermal processing, the porogen is dispersed. Once the nanohybrid material is formed, the porogen molecules can then be eliminated, for example by heating, radiation, extraction, or use of a chemical reagent effective to degrade the porogen, leaving voids in their place.

A desirable characteristic for porogens is compatibility with the polymer matrix, allowing dispersal throughout this matrix and thus the creation of porosity spread uniformly throughout the resulting nanoporous material. While the porogens may aggregate somewhat among themselves within the matrix during the formation of the nanoporous material, they preferably do so in a controllable manner and with the formation of nanoscopic domains.

A wide variety of porogens have been proposed and studied. See in this regard W. Volksen et al., "Porous Organosilicates for On-Chip Applications: Dielectric Generational Extendibity by the Introduction of Porosity," in *Low Dielectric Constant Materials for IC Applications*, P. S. Ho, J. Leu, W. W. Lee eds., chapter 6 (Springer-Verlag 2002).

Among the classes of porogens which have been studied, those which self-organize have received a fair amount of attention. In particular, as is well known, surfactants in solution may self-assemble into a variety of structures ranging from micelles to bilayers. Surfactants have been successfully employed to create nanoporosity in organosilicate matrices. See, e.g., Volksen et al., supra, at 171-72. Dendrimer self-organization in solution has also been studied. See in this regard J.-W. Weener et al., "Some Unique Properties of Dendrimers Based upon Self-Assembly and Host-Guest Properties," in J. M. J. Fréchet & D. A. Tomalia eds., *Dendrimers and other Dendritic Polymers* (Wiley 2001).

SUMMARY OF THE INVENTION

In one embodiment of the invention, a polymeric matrix is provided. The matrix comprises a first component, comprising at least one spatially unsymmetric organic amphiphilic molecule, and a second component which comprises at least one silicate. Each of the spatially unsymmetric molecules of the first component comprises at least one branched moiety having at least four arms and at least one linear or branched polymeric moiety. One of either the branched moiety and the linear or branched moiety is lyophobic, and the other is lyophilic.

In another embodiment of the invention, a substantially or roughly spherical micellar structure is formed by organization of one or more spatially unsymmetric organic amphiphilic molecules. Each of those molecules comprises a branched moiety and a second moiety. The branched moiety can form part of either the core or the surface of the roughly spherical micellar structure, depending on the polarity of the environment. The second moiety forms part of either the surface of the roughly spherical micellar structure, when the branched moiety forms part of the core, or forms part of the core of the roughly spherical micellar structure, when the branched moiety forms part of the surface. The roughly spherical micellar structure exists in a thermosetting polymeric matrix.

In another embodiment of the invention, a method of producing a nanoporous material is provided. In that method, a medium is provided into which an amphiphile is dispersed, the medium comprising both solvent and matrix material. The medium is dispensed onto a substrate. The solvent is removed, forming a solid structure that comprises the amphiphile dispersed in the matrix material. Porosity is generated in the matrix material via templated vitrification of the matrix followed by decomposing the amphiphile, thereby leaving porous regions in the matrix material. The amphiphile comprises at least one branched moiety and at least one linear or branched polymeric moiety. One of either the branched moiety or the linear or branched moiety is lyophilic, and the other is lyophobic.

DETAILED DESCRIPTION OF THE INVENTION

Figure 1:
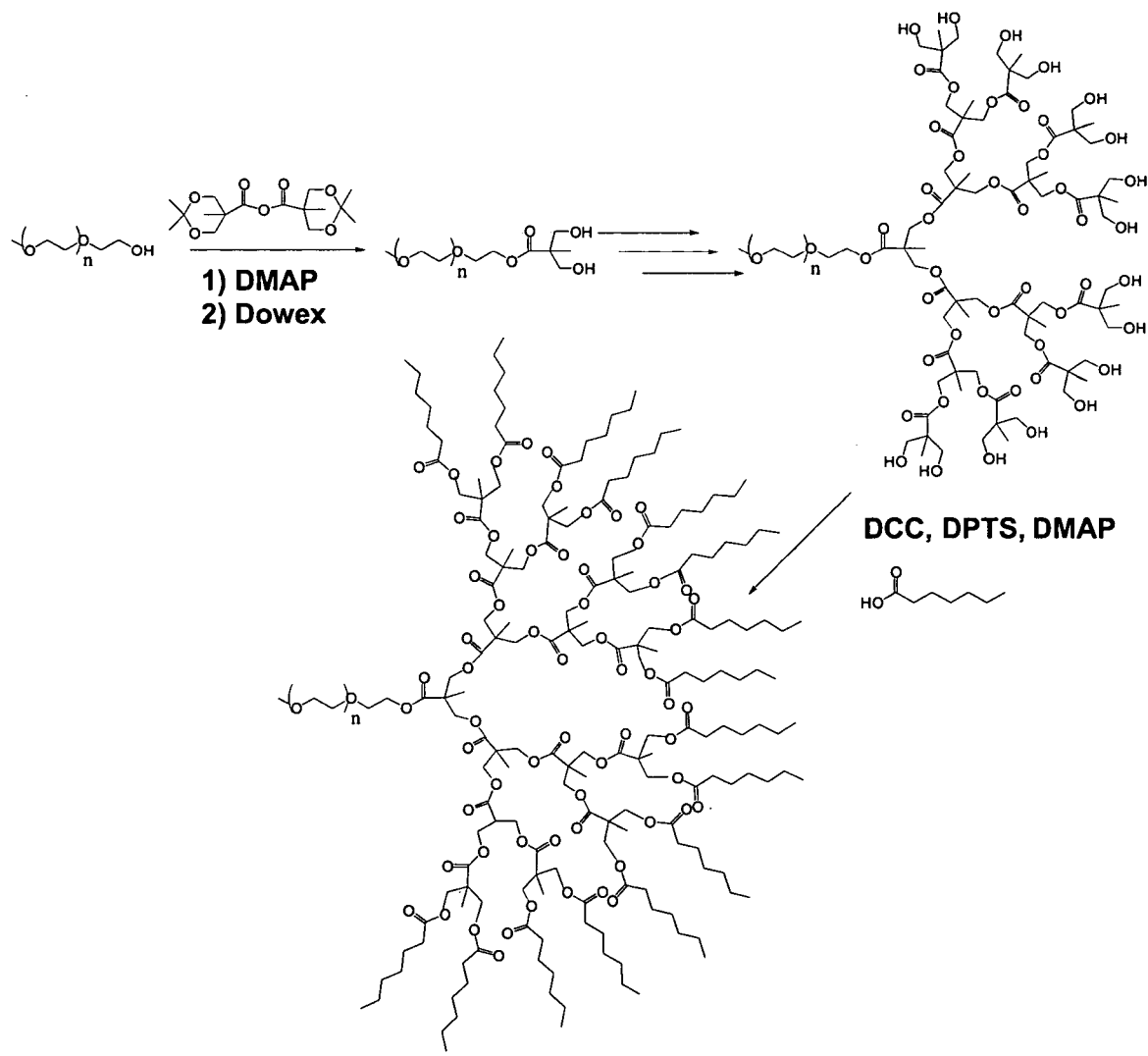
FIG. 1 schematically depicts chemical reactions suitable for synthesizing a preferred porogen.

Unless otherwise indicated, this invention is not limited to specific compositions, components, or process steps. It should also be noted that the singular forms "a" and "the" are intended to encompass plural referents, unless the context clearly dictates otherwise. The terminology used herein is for the purpose of describing particular embodiments only and is not intended to be limiting.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. "Substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the term "alkyl" includes linear, branched, cyclic, unsubstituted, substituted, and/or heteroatom-containing alkyl.

The term "alkenyl" as used herein refers to a linear, branched or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the term "alkenyl" includes linear, branched, cyclic, unsubstituted, substituted, and/or heteroatom-containing alkenyl.

The term "alkynyl" as used herein refers to a linear or branched hydrocarbon group of 2 to 24 carbon atoms containing at least one triple bond, such as ethynyl, n-propynyl, and the like. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the term "alkynyl" includes linear, branched, unsubstituted, substituted, and/or heteroatom-containing alkynyl.

The term "alkoxy" as used herein intends an alkyl group bound through a single, terminal ether linkage; that is, an "alkoxy" group may be represented as —O-alkyl where alkyl is as defined above.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom. If not otherwise indicated, the term "aryl" includes unsubstituted, substituted, and/or heteroatom-containing aromatic substituents.

The term "alkaryl" refers to an aryl group with an alkyl substituent, and the term "aralkyl" refers to an alkyl group with an aryl substituent, wherein "aryl" and "alkyl" are as defined above. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like.

The term "polymer" is used to refer to a chemical compound that comprises linked monomers, and that may be linear, branched, or crosslinked. The term also encompasses not only homopolymers, but also copolymers, terpolymers, and the like. The term "copolymer," unless specifically indicated otherwise, refers to a polymer containing at least two different monomer units.

When a functional group is termed "protected," this means that the group is in modified form to preclude undesired side reactions at the protected site. Suitable protecting groups for the compounds of the present invention will be recognized from the present application taking into account the level of skill in the art, and with reference to standard textbooks, such as Greene et al., *Protective Groups in Organic Synthesis* (New York: Wiley, 1991).

The term "branched polymer" here is used to indicate a polymer which is not linear, that is, one in which the polymer molecule is not composed primarily of a single linear chain of monomers linked end to end. Highly branched polymers include, for example, dendrimers and hyperbranched polymers.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

In one embodiment of the invention, a roughly spherical micellar structure is formed by one or more spatially unsymmetric organic amphiphilic molecules. Each of those molecules comprises a branched moiety and a second moiety. The branched moiety can form part of either the core or the surface of the spherical micellar structure. The second moiety forms part of either the surface of the spherical micellar structure, when the branched moiety forms part of the core, or forms part of the core of the micellar structure, when the branched moiety forms part of the surface. The roughly spherical micellar structure exists in a thermosetting polymeric matrix.

The spherical micellar structures of this embodiment are useful, for example, as precursors to porosity. For this porogen use of these micellar structures, it is preferable if they persist while the thermosetting polymeric matrix is cured, and are removable by a process which can occur subsequent to cure.

The thermosetting polymeric matrix of this embodiment may comprise, for example, inorganic thermosets, silsesquioxanes, organic silicas, or organic thermosetting resins, such as SiLK (Dow Chemical Company). Organosilicates may be chosen from a wide variety of organosilicates which form useful solids. The organosilicates may be, for example, (i) silsesquioxanes; (ii) partially condensed alkoxysilanes; (iii) organically modified silicates having the composition $RSiO_3$ and $R_2SiO_2$; and (iv) partially condensed orthosilicates having the composition $Si(OR)_4$, wherein R is alkyl, alkenyl, alkynyl, alkoxy, aryl, aralkyl, alkaryl, or halo. If the organoslicate is a silsesquioxane, it may be, for example, methyl silsesquioxane, polymethyl silsesquioxane, polymethylhydroxyl silsesquioxane, polyphenyl silsesquioxane, polyphenylmethyl silsesquioxane, polyphenylpropyl silsesquioxane, polyphenylvinyl silsesquioxane, polycyclohexyl silsesquioxane, polycyclopentyl silsesquioxane, polycyclohexyl silsesquioxane, poly(2-chloroethyl)silsesquioxane, or copolymers of these. Useful organosilicates are also listed in U.S. Pat. No. 6,399,666.

The spatially unsymmetric organic amphiphiles of the invention are preferably intermediate in character between those of formed from dynamic self-assembly of conventional surfactants and block copolymers. Preferably, the dendritic segment collapses to a dense hydrophobic/hydrophilic core in the matrix and this structure (often having a ball and chain type molecular architecture) is dispersed in the matrix. In general terms, the most preferred amphiphiles are those which can assume the shape of assembled surfactants and the size of block copolymers. This flexibility allows one to template a wide variety of porous morphologies through an amphiphile-organosilicate self-organization process, including closed pore morphologies where each pore is formed by the vitrification of the matrix around a micellar structure which is then removed.

The spatially unsymmetric amphiphiles of the invention comprise, as has been indicated, a branched moiety and a second moiety. In the preparation of these spatially unsymmetric amphiphiles, a wide variety of techniques for the preparation of branched moieties can be employed. A number of techniques for the preparation and characterization of dendrimers, dendrons, dendrigrafts, and hyperbranched polymers are known. See, in particular, the book by Fréchet and Tomalia cited above. Examples of dendrimers and dendrons, and methods of synthesizing the same are set forth in U.S. Pat. Nos. 4,507,466; 4,558,120; 4,568,737; 4,587,329; 4,631,337; 4,694,064; 4,713,975; 4,737,550; 4,871,779 and 4,857,599. Examples of hyperbranched polymers and methods of preparing the same are set forth, for example, in U.S. Pat. No. 5,418,301. Some dendritic polymers are also commercially available. For example, 3- and 5-generation hyperbranched polyester polyols may be obtained from Perstorp Polyols, Inc., Toledo, Ohio.

A possible synthetic technique for hyperbranched polymers is the one-pot polymerization reaction of a single type of monomer having a single reactive group of a first type (B) and a plurality (y) of reactive groups of a second type (A), i.e., a B-Ay type monomer. The one-pot synthesis method for hyperbranched polymers is simpler and less expensive than the divergent and convergent synthesis methods for dendrimers. However, the one-pot synthesis method lacks reaction control, which leads to more polydisperse products with larger deviations from ideal dendron structures.

Dendrimers can be prepared by either convergent or divergent synthesis. Divergent synthesis of dendrimers involves a molecular growth process which occurs through a consecutive series of geometrically progressive step-wise additions of branches upon branches in a radially outward molecular direction to produce an ordered arrangement of layered branch generations, in which each macromolecule includes a core generation, one or more layers of internal generations, and an outer layer of surface generations. Each of the generations includes a single branch juncture. The generations can be the same or different in chemical structure and branching functionality. The surface branch generations may contain either chemically reactive or passive functional groups. Chemically reactive surface groups can be used for further extension of dendritic growth or for modification of dendritic molecular surfaces. The chemically passive groups may be used to physically modify dendritic surfaces, such as to adjust the ratio of hydrophobic to hydrophilic moieties. Convergent synthesis of dendrimers involves a growth process which begins from what will become the surface of the dendrimers and progresses radially in a molecular direction toward a focal point or core.

The spatially unsymmetric amphiphiles of the invention have a second moiety. This second moiety may be branched or linear. It may lie on the outside of the micellar structure or in its core.

When the second moiety of the spatially unsymmetric amphiphile lies on the outside of the micellar structure, it is preferably compatible with the thermosetting polymeric matrix, at least prior to the vitrification process. For certain common thermosetting polymers, this compatibility will often imply that the second moiety is hydrophilic.

The second moiety of the spatially unsymmetric amphiphile may belong to a wide variety of linear and branched polymer families. It is preferred that this moiety, if branched, have fewer than four branches. Among linear polymers, polyethylene glycols (PEGs) and polypropylene glycols are particularly preferred. PEGs have been shown to be miscible with organosilicate prepolymers over a wide compositional and molecular weight range. The degree of polymerization of these linear polymers is variable but may preferably be between 50 and 500, more preferably between 100 and 250.

The micellar structures of the invention, in part on account of their possible application in the formation of porous dielectrics for integrated circuits, preferably have a diameter in the range of about 1 nm to about 50 nm, preferably in the range of about 1 nm to about 25 nm, more preferably in the range of about 1 nm to about 10 nm, and still more preferably in the range of about 2 nm to about 8 nm. In integrated circuits, it is preferable that the pores be substantially smaller than the smallest device features, which are <90 nm in the current generation of semiconductor processes. In certain applications larger pores may be useful, for example pores with sizes up to about 200 nm or up to about 1000 nm (1 μm).

The process of micellar structure formation is facilitated by considering compatibility and incompatibility of the separate moieties making up the amphiphile. In particular, micellar structure formation is facilitated if the moieties which form part of the core of the micellar structure are insoluble in or incompatible with the thermosetting matrix prior to cure, while the moieties which are on the outside of the micellar structure are soluble in or compatible with the thermosetting matrix prior to cure. Thus, for example, if the thermosetting matrix is polar prior to cure, it may be desirable that the moieties on the outside of the micellar structure also be polar, and vice versa. The compatibility of the different moieties of the spatially unsymmetric amphiphiles may be affected by choice of the monomers out of which they are constructed, or by the addition of suitable end groups. Example 1 illustrates the addition of alkyl end groups to make the branched moiety more hydrophobic. Example 2 shows some of the differences between the conformation of spatially unsymmetric amphiphiles in different solvents, showing how the environment affects these amphiphiles.

A particularly preferred approach to the synthesis of amphiphiles capable of forming micellar structures is shown in FIG. 1. The starting materials are PEG alcohols and 2,2'-bis hydroxy methyl propanoic acid,

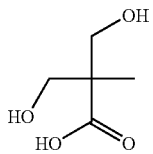

referred to as bis-MPA. The bis-MPA is acetonide-protected and then self-condensed into an anhydride,

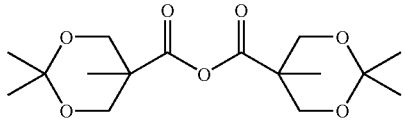

The anhydride is then reacted with the PEG alcohol, and the hydroxyl groups in the resulting ester are deprotected, producing:

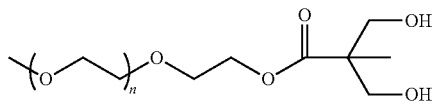

This can again be reacted with the protected anhydride, and the resulting moiety deprotected, producing:

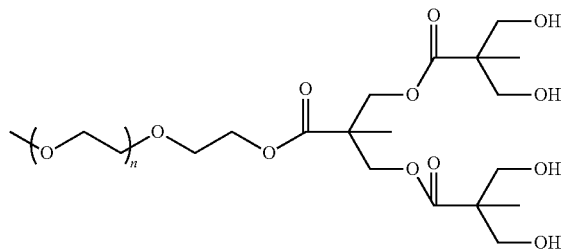

Repetition of these steps leads to spatially unsymmetric moieties which have PEG "tails" attached to polyester dendrimers of any desired number of generations. Further details about this particularly preferred approach are given in Example 1.

In another embodiment of the invention, a polymeric matrix is provided. The matrix comprises a first component, comprising at least one spatially unsymmetric organic amphiphilic molecule, and a second component which comprises at least one silicate. Each of the spatially unsymmetric molecules of the first component comprises at least one branched moiety having at least four arms and at least one linear or branched polymeric moiety. One of either the branched moiety and the linear or branched moiety is lyophobic, and the other is lyophilic.

The techniques and structures described previously for forming amphiphiles are generally applicable to the spatially unsymmetric organic amphiphilic molecules of this embodiment. In particular, the branched moiety may be formed by a wide variety of processes which give rise to dendimers and hyperbranched polymers.

The silicates comprising the second component of the polymeric matrix of the invention are preferably organosilicates. The organosilicates recited previously are generally useful, particularly the silsequioxanes.

In another embodiment of the invention, a method of producing a nanoporous material is provided. In that method, a medium is provided into which an amphiphile is dispersed, the medium comprising both solvent and matrix material. The medium is dispensed onto a substrate. The solvent is removed, forming a solid structure that comprises the amphiphile dispersed in the matrix material. Porosity is generated in the matrix material via a templating vitrification of the matrix followed by decomposing the amphiphile, thereby leaving porous regions in the matrix material. The amphiphile comprises at least one branched moiety and at least one linear or branched polymeric moiety. One of either the branched moiety or the linear or branched moiety is lyophilic, and the other is lyophobic.

Figure 6:
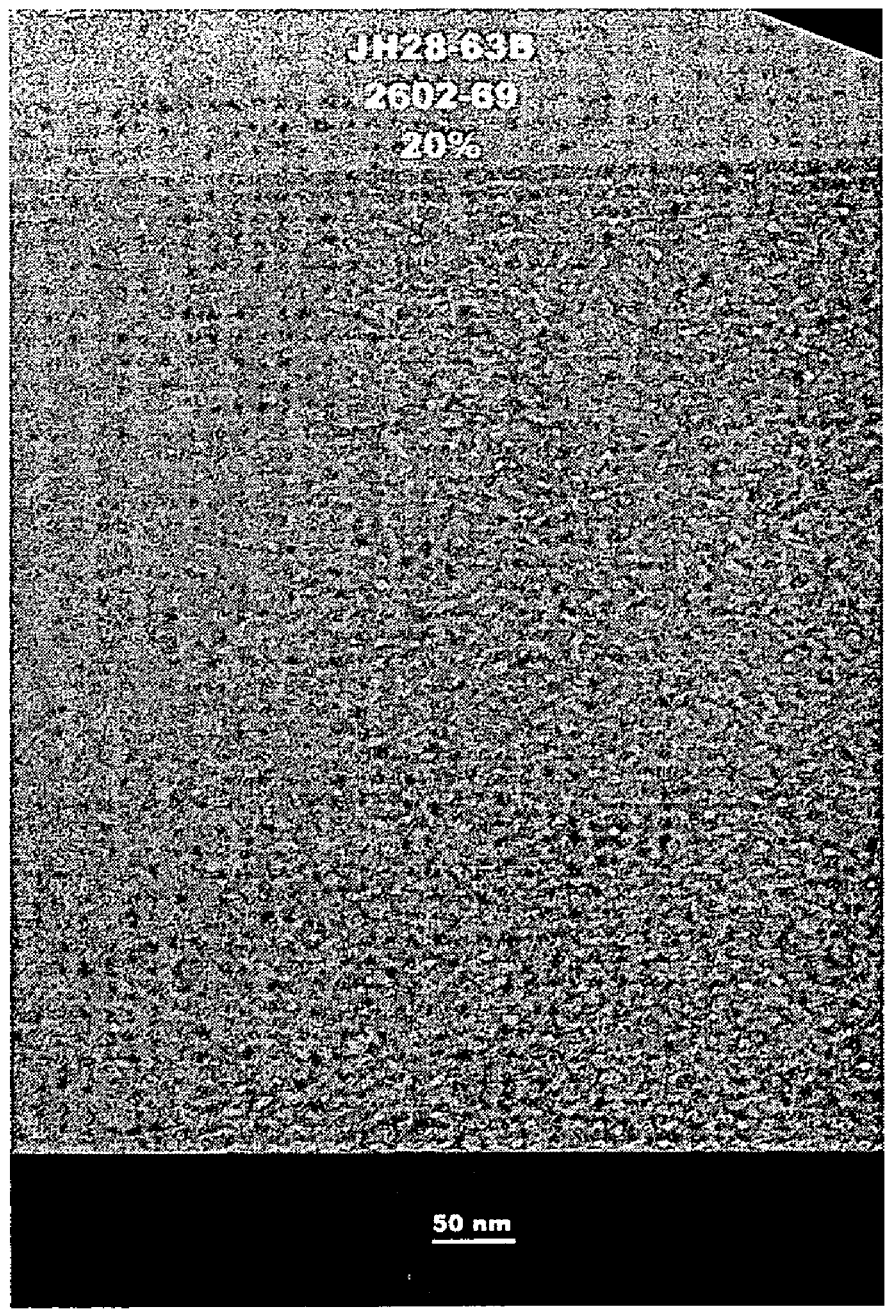
FIG. 6 shows a transmission electron micrograph of a mesoporous structure of the invention using porogen 1-a at 20 wt. %.

FIG. 6 is a transmission electron microscope (TEM) photograph of a cross-section of a nanoporous material of the invention. As may be seen, spherical pores were successfully produced, using 20 wt. % porogen loading. The details of how this was accomplished are described in Examples 1 and 3 below.

In the practice of these methods of the invention, the same general classes of amphiphiles discussed previously may be employed. The issues of compatibility with the matrix material, as discussed previously, are relevant to the practice of these methods. In particular, the matrix material will often be an organosilicate as discussed above, and so compatibility with organosilicates is an issue.

In the practice of the methods of the invention it is preferable if the amphiphile is able to form a roughly spherical micellar structure. A reason for this preference is that micellar structures are one way to achieve closed pores, which are often preferable in dielectric applications, using reasonable porogen loading levels (e.g., below 30 wt. %).

By suitable choice of porogen dimensions it is possible to control the size of the pores which result from the practice of the methods of the invention. Preferred ranges of pore sizes have been noted above. It is preferred that the pores be uniformly distributed in the matrix material, which may often be accomplished by dispersing the porogens uniformly through compatibilizing shell substituents.

The dielectric constants of the nanoporous materials of the invention will preferably be in the range of 1.0 to 3.0, more preferably 1.5 to 2.0. The dielectric constant is influenced by the volumetric porosity of the material. A high volumetric porosity, while it lowers dielectric constant, may weaken the material structurally. A preferred volumetric porosity is between 10% and 50%, more preferably between 10% and 35%. At porosities above 20 vol. % some pore interconnectivity can be expected.

It is to be understood that while the invention has been described in conjunction with the preferred specific embodiments thereof, that the foregoing description as well as the examples that follow are intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties. However, where a patent or application containing express definitions is incorporated by reference, those express definitions should be understood to apply to the incorporated patent or patent application in which they are found, and not to the remainder of the text of this application, in particular the claims of this application.

Unless otherwise indicated, all reagents were obtained commercially or synthesized according to known methods.

The following examples are detailed descriptions of the process of the invention. The detailed preparations fall within the scope of and serve to exemplify, the more generally described methods set forth above. The examples are presented for illustrative purposes only and are not intended to narrow the scope of the present invention in any way.

Example 1

Preparation of PEG-Dendrimer Copolymers

Acetonide protected bis-MPA was produced from bis-MPA using standard acetonide protection reactions from the literature. Acetonide-protected bis-MPA anhydride was prepared by self-condensation of the acetonide-protected bis-MPA using N,N'-dicyclohexylcarbodiimide (DCC). The acetonide-protected bis-MPA anhydride was reacted with PEG alcohols of molecular weights approximately 4,800 and 9,800 in the presence to DMAP (dimethylamino pyridine, 0.25 mol % with respect to anhydride) in $CH_2Cl_2$/pyridine solvent mixture (90/10). To insure quantitative conversion of the terminal hydroxyl groups, ~2-4 fold excess of anhydride was used and the reaction was performed at room temperature (~15-18 h) under nitrogen atmosphere. Upon completion, the excess anhydride was reacted with methanol to facilitate purification since the side products generated are soluble in ether and the PEG copolymers are not allowing polymer precipitation. Prior to precipitation, the solution was stirred (~3 h) with Amberlyst resin to remove acidic by-products. After precipitation, the product (acetonitride protected PEG bis-MPA ester) was isolated as a white powder (~80-85% yield). Deprotection of the acetonide groups was accomplished using DOWEX 50W-X2 ion exchange resin in methanol at 50° C. for 5 hours.

Figure 2:
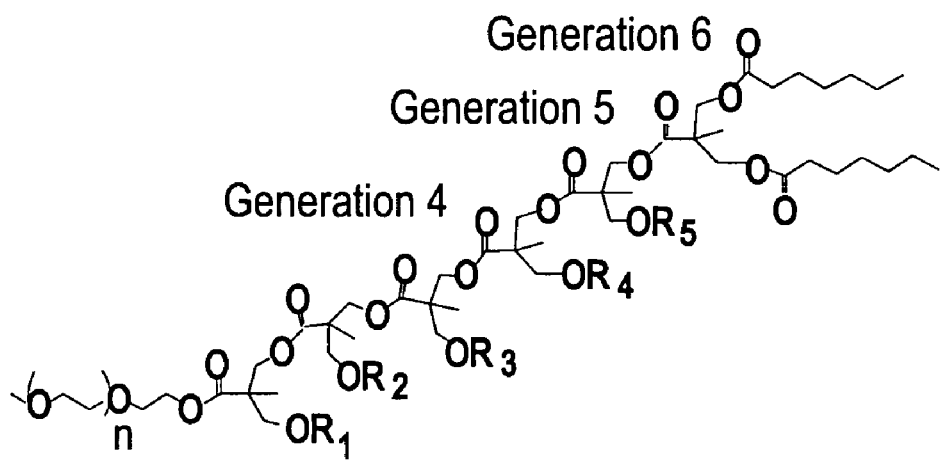
FIG. 2 depicts size exclusion chromatography (SEC) data for three preferred amphiphilic copolymer porogens of the invention.
Figure 2:
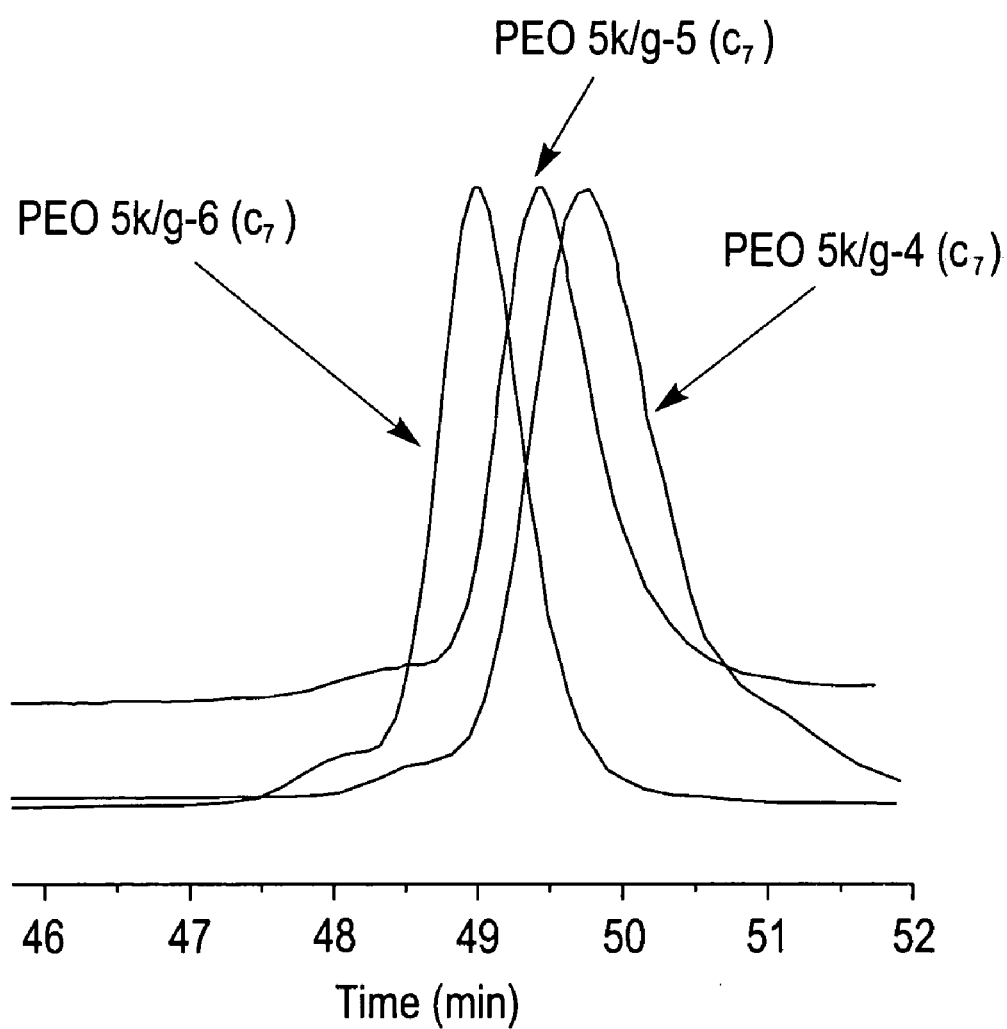

The reactions indicated above were repeated to produce bis-MPA dendrons of successive generations up to 6. The surface hydroxyl groups of the dendrons for generations 4-6 were subsequently functionalized by esterification with heptanoic acid in $CH_2Cl_2$ using DCC/DPTS (4-(dimethylamino) pyridinium 4-toluenesulfonate)/DMAP. (The groups could also be functionalized using deuterated heptanoic acid or ferrocene carboxylic acid under similar conditions in order to enhance imaging by SANS (small angle neutron scattering), TEM or SAXS (small angle X-ray scattering).) $^{13}C$ NMR spectroscopy of the terminal quarternary carbons of the bis-MPA showed quantitative conversion to the esterified product. FIG. 2 depicts the SEC (size exclusion chromatography) results from analysis of generation 4, 5, and 6 PEG-dendrimer copolymers. The following table depicts certain characteristics of these copolymers. (In this table GPC stands for gel permeation chromatography and PDI for polydispersity index.)

| Sample Entry | $M_n$ (g/mol) PEG segment | Dendron Generation/ $M_n$ (g/mol) | Dendron Fraction (wt %) | $M_n$ $^1$H NMR | $M_n$ GPC | PDI |
|---|---|---|---|---|---|---|
| 1-a | 4,800 | 4/4,030 | 45 | 9,000 | 9,700 | 1.08 |
| 1-b | 4,800 | 5/8,200 | 63 | 13,000 | 11,300 | 1.03 |
| 1-c | 4,800 | 6/12,000 | 71 | 16,800 | 14,000 | 1.04 |

-continued

| Sample Entry | $M_n$ (g/mol) PEG segment | Dendron Generation/ $M_n$ (g/mol) | Dendron Fraction (wt %) | $M_n$ $^1$H NMR | $M_n$ GPC | PDI |
|---|---|---|---|---|---|---|
| 2-a | 9,800 | 4/4,030 | 29 | 14,000 | 16,500 | 1.05 |
| 2-b | 9,800 | 5/8,200 | 45 | 18,000 | 18,200 | 1.05 |
| 2-c | 9,800 | 6/12,000 | 55 | 21,500 | 20,000 | 1.04 |

Note that a molecular weight of 4,800 for PEG corresponds to a degree of polymerization of about 110.

Example 2

Figure 3:
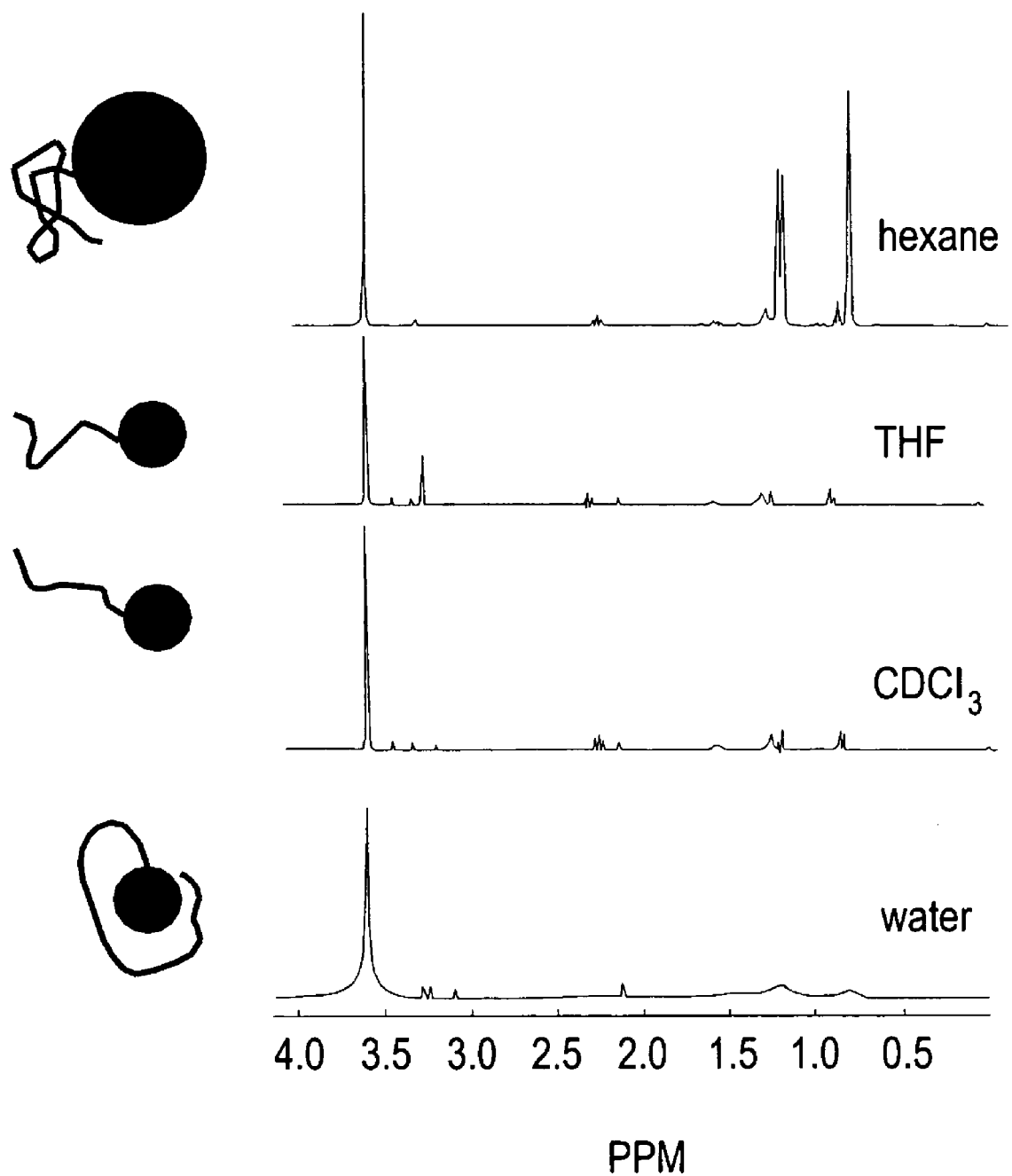
FIG. 3 presents $^1$H NMR spectra for an amphiphilic copolymer porogen of the invention in four different solvents, together with schematic drawings of the shape that such a copolymer is believed to assume in solution in the respective solvent.

Effect of Solvent on PEG-Dendrimer Copolymers $^1$H NMR spectra for the PEG-dendrimer copolymers of Example 1 were taken in hexane-$d_{14}$, deuterated water, THF-$d_8$, and $CDCl_3$. Hexane is a good solvent for the nonpolar dendritic component of these copolymers, deuterated water is a good solvent for the polar PEG component, and THF and $CDCl_3$ are good solvents for both components. The spectra are depicted in FIG. 3. As can be seen, in hexane the peaks associated with the heptanoic acid function dendrimer are evident and sharp, whereas in water the peaks are broad and diffuse. In the remaining solvents, the signals for both components can be observed. These data support the view that the geometry of the preferred PEG-dendrimer copolymers changes with the environment.

Example 3

Films Templated with PEG-Dendrimer Copolymers

The PEG-dendimer copolymers were dissolved in a solution containing methyl silsesquioxane (MSSQ) prepolymer in propylene glycol monomethyl ether. The resulting solution was spun on a silicon wafer to produce thin films that were cured to 430° C. to effect cross-linking of the MSSQ and decomposition of the sacrificial templating copolymers.

Figure 4:
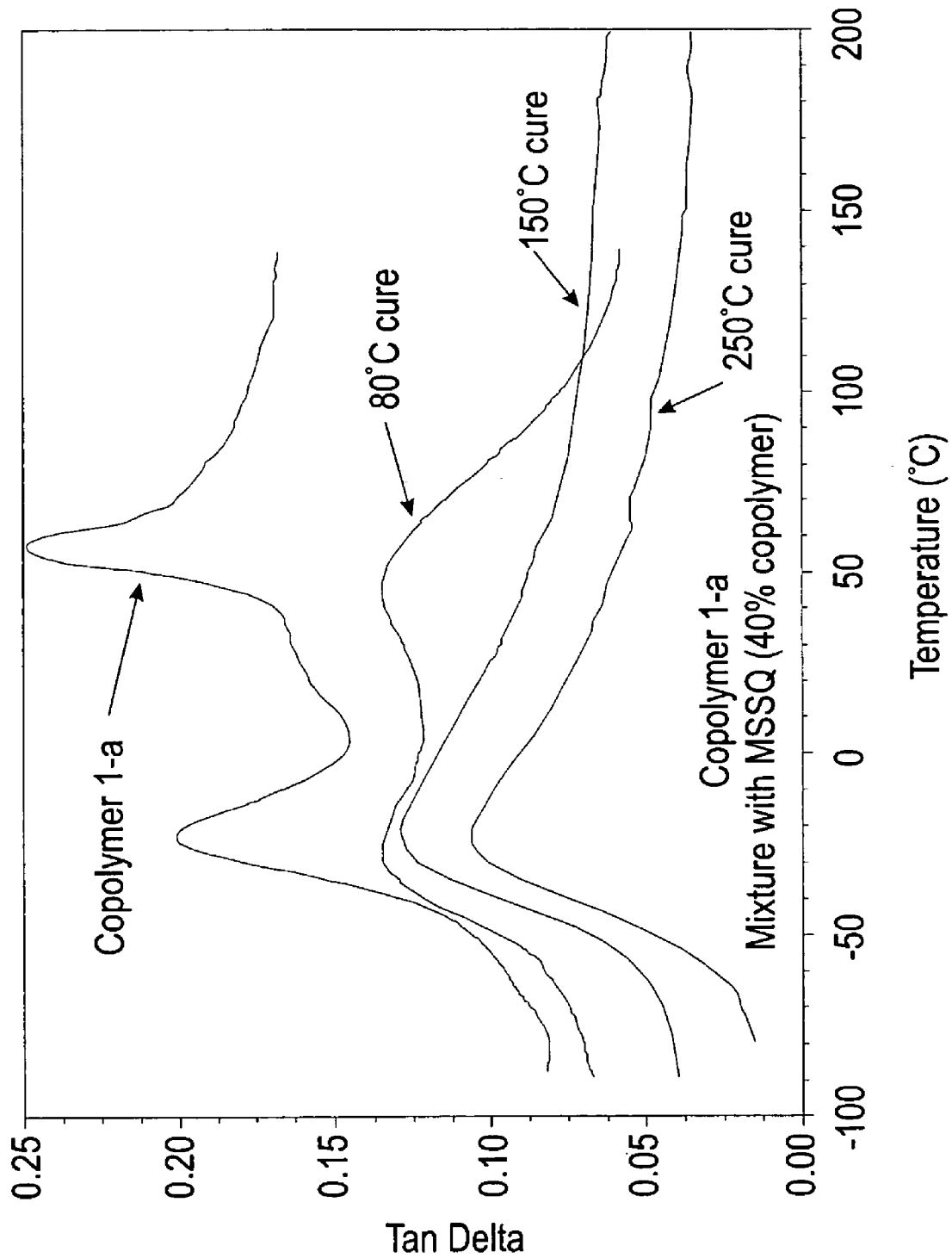
FIG. 4 presents dynamic mechanical analysis (DMA) tan δ data for a thin film of amphiphilic copolymer porogens of the invention and for three films containing such porogens partially cured to different temperatures.

FIG. 4 (top line) shows a Dynamic Mechanical Analysis (DMA) tan δ curve for a thin film of a PEG-fourth generation dendrimer copolymer of example 1. Note in particular that there are two $T_g$'s, which is indicative of microphase separated morphologies. It was found that the third through sixth generation copolymers also exhibit two $T_g$'s.

FIG. 4 (lines other than top line) shows representative tan δ curves obtained from Dynamic Mechanical Analysis (DMA) for a 1-a/MSSQ hybrid (40 wt. % copolymer loading) after cure temperatures of 80° (minimal advancement in MSSQ molecular weight), 150° (partial cure/advancement in molecular weight of MSSQ) and 250° C. (nearly complete cure or network formation of MSSQ). With the retention of the $T_g$ at –25° C. associated with the bis-MPA dendron phase, and the disappearance of the PEG transition, the data supports the existence of a two-phase structure formed prior to cure, irrespective of the cure temperature. The data precludes a nucleation and growth process, where the sacrificial polymer is initially miscible with the MSSQ and then phase separates with network formation. It is likely that the $T_g$ at 50° C. is the mixed $T_g$ of the PEG and MSSQ phases since they are miscible.

FIG. 6 shows a cross-sectional TEM micrograph of the nanoporous material resulting from a mixture of 20 wt. % of sample 1-a (a 4th generation dendron+about 4,800 daltons of PEG) in MSSQ. The spherical structure of the pores is visible. Films created with 40 wt. % and 60 wt. % porogen did not exhibit this spherical structure.

Figure 5:
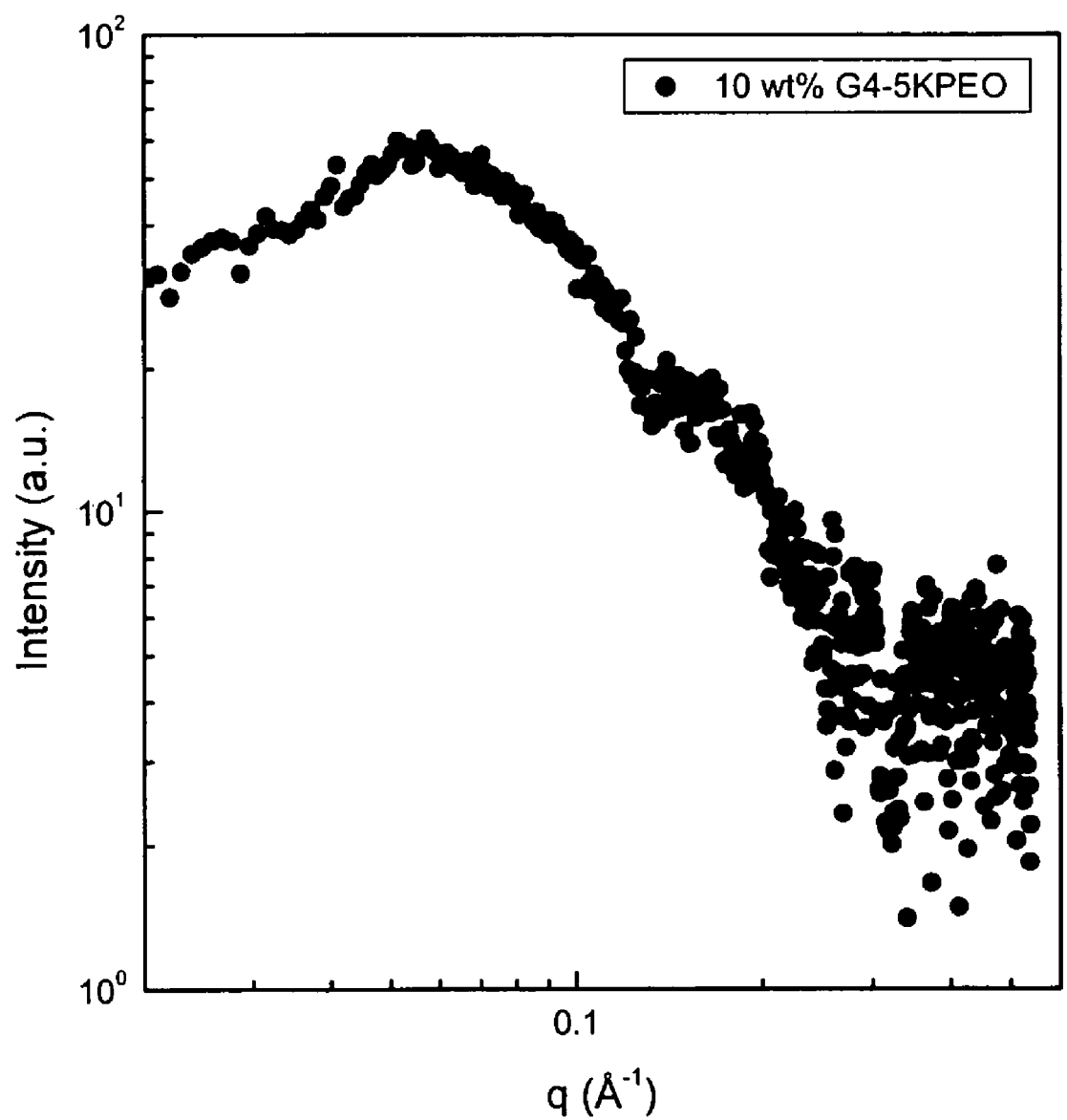
FIG. 5 presents SAXS data for mesoporous structures formed by methods of the invention.

Small angle X-ray scattering (SAXS) has been used to quantify nanoscopic structures. SAXS experiments were performed using the SB4-2 beam line at the Stanford Synchrotron Radiation Laboratory. FIG. 5 shows SAXS profiles of a porous organosilicate. In FIG. 5, we observed that scattering intensity increases with increasing amount of G4-PEG5K (generation 4 dendrimer+PEG 4,800 daltons, sample 1-a) porogen (20 wt. % sample not shown). Above 40 wt. % loadings, the random spherical morphology is no longer observed. The pore diameter increases with higher generations of dendritic component in the copolymer (data not shown). That is, the peak position shifts to lower q region with increasing generation of dendritic component.

X-ray reflectivity (XR) provides information in the film thickness direction. Random distribution of spherical voids is not manifested by the defined reflection peaks in the XR traces.

We claim:

1. A method of producing a nanoporous material, comprising:
   providing a medium into which an amphiphile is dispersed, the medium comprising both solvent and matrix material;
   dispensing the medium onto a substrate;
   removing the solvent, thereby forming a solid structure that comprises the amphiphile dispersed in the matrix material; and
   generating porosity in the matrix material via a templating mechanism by decomposing the amphiphile, thereby leaving porous regions in the matrix material,
   wherein the amphiphile comprises at least one branched moiety attached to one linear polymeric moiety, wherein the linear polymeric moiety has a degree of polymerization of between 50 and 500, and one of either the branched moiety or the linear polymeric moiety is lyophilic, and the other is lyophobic.

2. A method of producing a nanoporous material according to claim 1, wherein the weight percentage of the amphiphile which is dispersed in the total weight of amphiphile plus matrix material lies between about 1% and about 30%.

3. The method of producing a nanoporous material according to claim 2, wherein the weight percentage of the amphiphile which is dispersed in the total weight of amphiphile plus matrix material is about 20%.

4. A method of producing a nanoporous material according to claim 1, wherein the pores formed by the method have an average diameter of from about 1 nm to about 50 nm.

5. A method of producing a nanoporous material according to claim 1, wherein the pores formed by the method have an average diameter of from about 1 nm to about 10 nm.

6. A method of producing a nanoporous material according to claim 1, wherein the pores formed by the method have an average diameter of from about 2 nm to about 8 nm.

7. A method of producing a nanoporous material according to claim 1, wherein the pores formed by the method are uniformly distributed throughout the matrix material.

8. A method of producing a nanoporous material according to claim 1, wherein the porous matrix material so formed has a dielectric constant of between 1.0 and 3.0.

9. A method of producing a nanoporous material according to claim 1, wherein the porous matrix material so formed has a dielectric constant of between 1.5 and 2.0.

10. The method of producing a nanoporous material according to claim 1, wherein the volumetric porosity of the nanoporous material is between 1% and 35%.

11. The method of producing a nanoporous material according to claim 1, wherein the linear polymeric moiety comprises polyethylene glycol or polypropylene glycol.

12. The method of producing a nanoporous material according to claim 1, wherein the branched moiety comprises a dendrimer.

13. The method of producing a nanoporous material according to claim 1, wherein the matrix material comprises an organosilicate.

14. The method of producing a nanoporous material according to claim 1, wherein the amphiphile forms a micellar structure.

15. The method of producing a nanoporous material according to claim 1, wherein the branched moiety is chosen to be compatible with the matrix.

16. The method of claim 1, wherein the amphiphile has the structure.

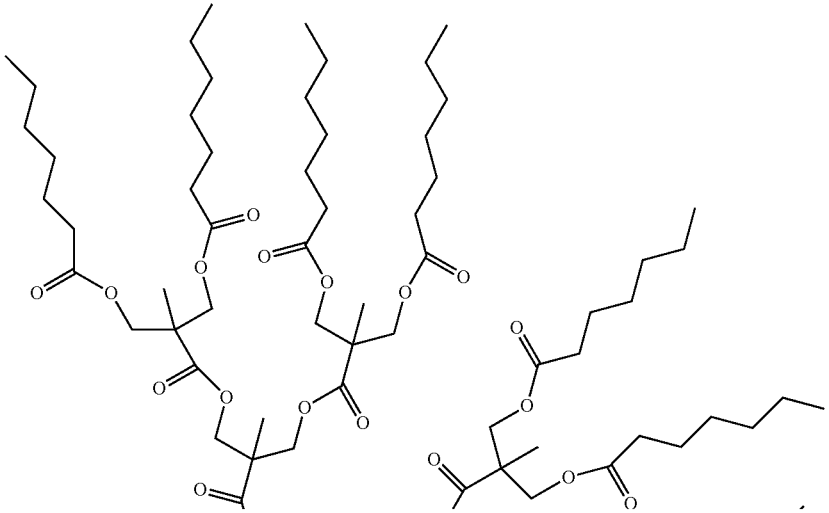

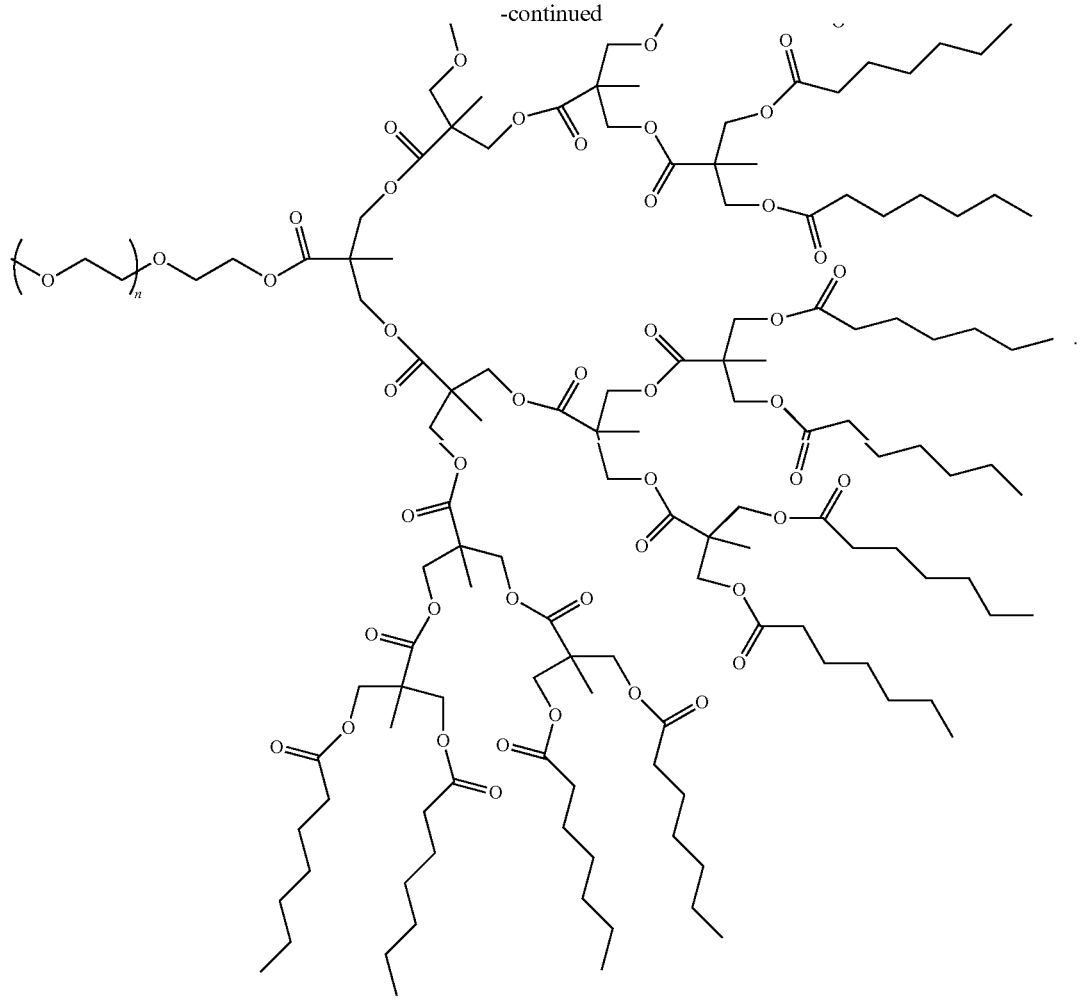

17. The method of claim 16, wherein n is 110.

18. The method of claim 1, wherein the at least one branched moiety is lyophobic, and wherein the linear polymeric moiety is lyophilic.

19. The method of claim 18, wherein the amphiphile forms a micellar structure in the medium, and wherein the linear polymeric moiety lies on the outside of the micellar structure.

20. The method of claim 1, wherein the amphiphile is spatially unsymmetric and is prepared by a method comprising:

(1) preparation of the compound

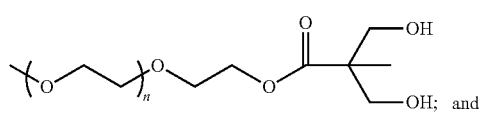

(2) reaction of the compound from (1) with the anhydride

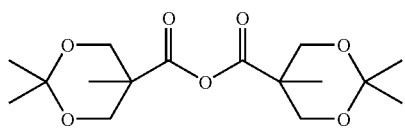

to produce a reaction product having the structure

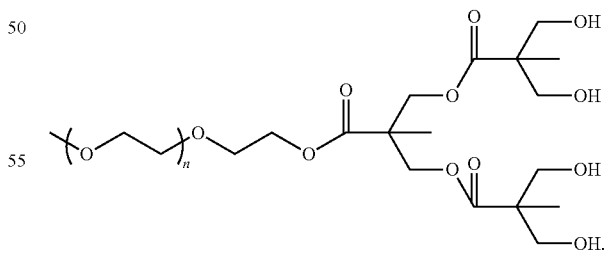

21. The method of claim 20, wherein n is 110.

* * * * *